US012602224B2

(12) United States Patent
Kuehnel et al.

(10) Patent No.: US 12,602,224 B2
(45) Date of Patent: Apr. 14, 2026

(54) NON-TERMINATING FIRMWARE UPDATE

(71) Applicant: Oracle International Corporation, Redwood Shores, CA (US)

(72) Inventors: Thomas Werner Kuehnel, Seattle, WA (US); Sunil Vikram Soman, Seattle, WA (US); Amith Kumar Nuggehalli Ramachandra, Redmond, WA (US); Bing Zheng, Issaquah, WA (US); Zachary Hawk Berkshire, Lexington, KY (US)

(73) Assignee: Oracle International Corporation, Redwood Shores, CO (US)

( * ) Notice: Subject to any disclaimer, the term of this patent is extended or adjusted under 35 U.S.C. 154(b) by 0 days.

(21) Appl. No.: 18/135,644

(22) Filed: Apr. 17, 2023

(65) Prior Publication Data

US 2023/0350670 A1     Nov. 2, 2023

Related U.S. Application Data

(60) Provisional application No. 63/336,848, filed on Apr. 29, 2022.

(51) Int. Cl.
| | |
|---|---|
| *G06F 15/16* | (2006.01) |
| *G06F 8/65* | (2018.01) |
| *G06F 9/4401* | (2018.01) |
| *G06F 9/54* | (2006.01) |
| *H04L 29/06* | (2006.01) |

(52) U.S. Cl.
CPC .............. *G06F 8/66* (2013.01); *G06F 9/4401* (2013.01)

(58) Field of Classification Search
CPC .................................. G06F 8/66; G06F 9/4401

USPC .......................................................... 709/221
See application file for complete search history.

(56) References Cited

U.S. PATENT DOCUMENTS

| | | | |
|---|---|---|---|
| 7,499,988 B2 * | 3/2009 | Keohane | H04L 67/1097 707/999.01 |
| 9,176,752 B1 * | 11/2015 | Marr | G06F 9/44505 |
| 2007/0192466 A1 * | 8/2007 | Nahum | G06F 9/4416 709/223 |
| 2009/0113416 A1 * | 4/2009 | Bealkowski | G06F 8/65 717/177 |
| 2016/0261455 A1 * | 9/2016 | Su | H04L 41/069 |
| 2016/0283221 A1 * | 9/2016 | Kochar | G06F 8/654 |
| 2017/0131991 A1 * | 5/2017 | Su | G06F 8/66 |
| 2018/0167380 A1 * | 6/2018 | Debickes | G06F 21/57 |
| 2018/0329862 A1 * | 11/2018 | Cao | G06F 21/572 |

(Continued)

*Primary Examiner* — Hamza N Algibhah
(74) *Attorney, Agent, or Firm* — Kilpatrick Townsend & Stockton LLP

(57) ABSTRACT

A computing device of the control plane may disconnect a server from at least one of a network path or a first boot storage device, the server having an initial network address. The computing device of the control plane may store a server state of the server in a storage device of the control plane. The computing device of the control plane may connect the server to an update storage device containing an update code. The computing device of the control plane may instruct the server to execute the update code. The computing device of the control plane may determine that the server has executed the update code. The computing device of the control plane may restore the server to the server state. The computing device of the control plane may reconnect the server to at least one of the network path or the first boot storage device.

20 Claims, 13 Drawing Sheets

(56) References Cited

U.S. PATENT DOCUMENTS

| 2020/0257517 | A1* | 8/2020 | Seater | .................... | G06F 1/3206 |
| 2021/0318860 | A1* | 10/2021 | Machida | ............... | H04L 41/082 |
| 2022/0113954 | A1* | 4/2022 | Valentine | ............ | H04L 63/0807 |
| 2023/0244564 | A1* | 8/2023 | Mink | ........................ | G06F 8/65 |
| | | | | | 717/168 |

* cited by examiner

300

500

Compute » Instances » Instance Details bare-metal-instance-maintenance-test

Figure 6:
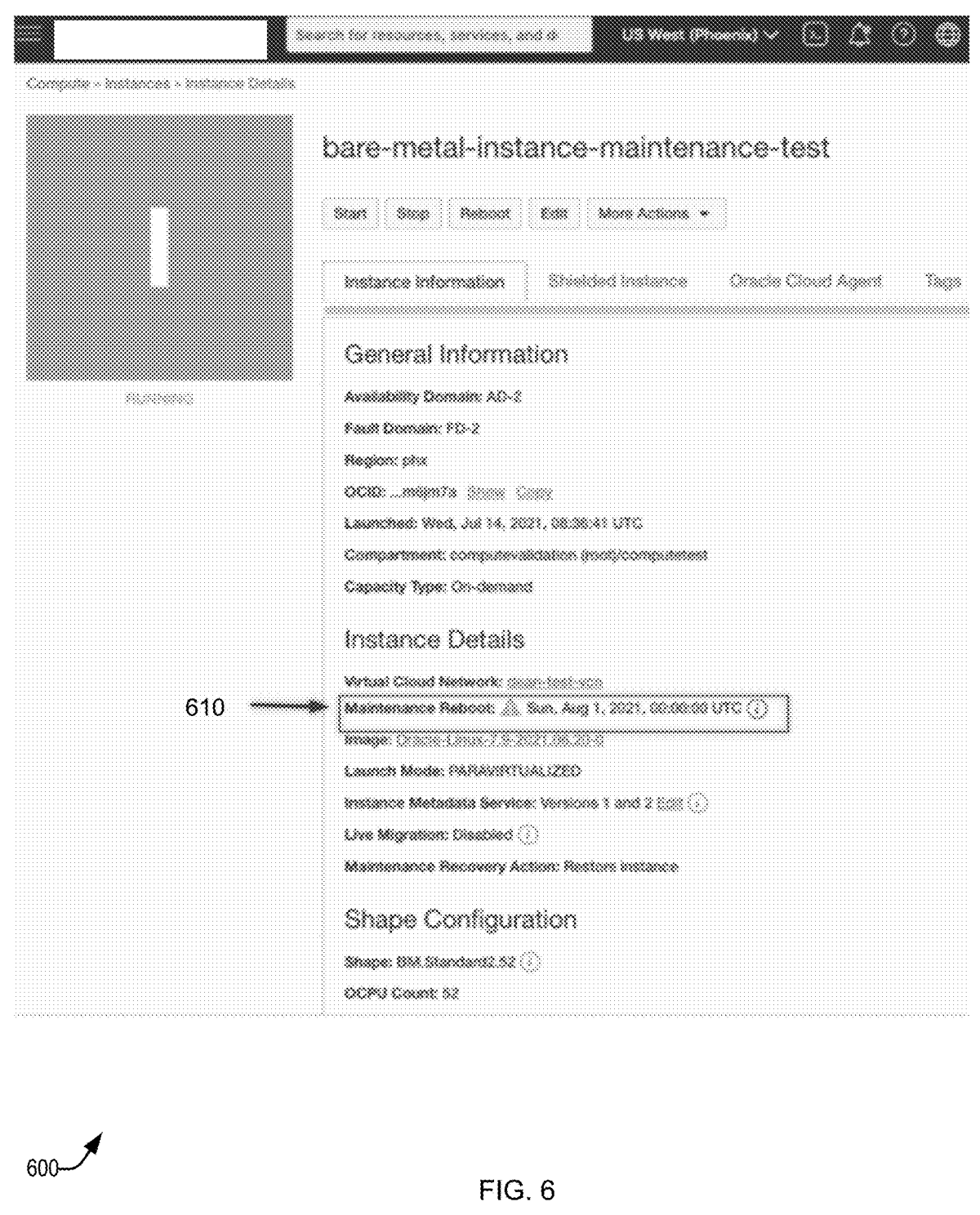

[ Start ] [ Stop ] [ Reboot ] [ Edit ] [ More Actions ▾ ]

Instance Information    Shielded Instance    Oracle Cloud Agent    Tags

General Information

Availability Domain: AD-3

Fault Domain: FD-2

Region: phx

OCID: ...x6jm7a  Show  Copy

Launched: Wed, Jul 14, 2021, 08:36:41 UTC

Compartment: compute-vaildation (root)/computetest

Capacity Type: On-demand

Instance Details

Virtual Cloud Network: dcar-test-vcn

610 ──────▶ Maintenance Reboot: ⚠ Sun, Aug 1, 2021, 00:00:00 UTC ⓘ

Image: Oracle-Linux-7.9-2021.06.20

Launch Mode: PARAVIRTUALIZED

Instance Metadata Service: Versions 1 and 2 Edit ⓘ

Live Migration: Disabled ⓘ

Maintenance Recovery Action: Restore Instance

Shape Configuration

Shape: BM.Standard2.52 ⓘ

OCPU Count: 52

Disconnect the server
810

Store the server state
820

Connect the server 830

Instruct the server 840

Determine execution
850

Restore the server
state 860

Reconnect the server
870

800

NON-TERMINATING FIRMWARE UPDATE

CROSS-REFERENCE TO RELATED APPLICATIONS

The present application is a non-provisional application of and claims the benefit and priority under 35 U.S.C. 119(e) of U.S. Provisional Application No. 63/336,848, filed Apr. 29, 2022, entitled "NON-TERMINATING FIRMWARE UPDATE," the entire contents of which is incorporated herein by reference for all purposes.

BACKGROUND OF THE INVENTION

Firmware updates for server host devices can improve performance and security. However, updates can be time consuming and disruptive for customers occupying an instance on the host. Changes to the firmware can change the host device's metadata which can cause additional headaches for customers. Accordingly, improvements to firmware updates for cloud devices are desirable.

BRIEF SUMMARY OF THE INVENTION

In some aspects, a method includes disconnecting a server from a network path or a first boot storage device by a computing device of the control plane. The server can have an initial network address. A server state of the server can be stored by the computing device of the control plane in a storage device of the control plane. The server can be connected to an update storage device containing an update code by the computing device of the control plane. The computing device of the control plane can instruct the server to execute the update code. The computing device of the control plane can determine that the server has executed the update code. The computing device of the control plane can restore the server to the server state. The server can be reconnected to at least one of the network path or the first boot storage device by the computing device of the control plane.

In some aspects, the method includes reconnecting the server by reconnecting server to a second boot storage device. The server can be reconnected by the computing device of the control plane.

In some aspects, the server comprises a bare metal machine (BM).

In some aspects, the method includes reconnecting the server by reconnecting the server to the network path using the initial network address. The server can be reconnected by the computing device of the control plane.

In some aspects, the method includes determining that the server has executed the updated code by instructing the server to perform diagnostic tests. The server can be instructed by the computing device of the control plane In some aspects, disconnecting the server further comprises providing an update notification to a user device. The notification can be provided by the computing device of the control plane.

In some aspects, the method includes disconnecting the server by accessing a request to update a server, and disconnecting the server. The server can be disconnected from a network path or a first boot storage device in response to the request.

In some aspects, a non-transitory computer-readable medium stores a set of instructions including one or more instructions that, when executed by one or more processors of a computing device of a control plane, configure a computing device of the control plane to: disconnect a server from a network path or a first boot storage device. The server can have an initial network address. The computing device can be configured to store a server state of the server in a storage device of the control plane. The computing device can be configured to connect the server to an update storage device containing an update code. The computing device can be configured to instruct the server to execute the update code. The computing device can be configured to determine that the server has executed the update code. The computing device can be configured to restore the server to the server state. The computing device can be configured to reconnect the server to at least one of the network path or the first boot storage device.

In some aspects, a computing device of a control plane includes: one or more memories; and one or more processors, communicatively coupled to the one or more memories, configured to disconnect a server from a network path or a first boot storage device. The server can have an initial network address. The one or more processors can be configured to store a server state of the server in a storage device of the control plane. The one or more processors can be configured to connect the server to an update storage device containing an update code. The one or more processors can be configured to instruct the server to execute the update code. The one or more processors can be configured to determine that the server has executed the update code. The one or more processors can be configured to restore the server to the server state. The one or more processors can be configured to reconnect the server to at least one of the network path or the first boot storage device.

BRIEF DESCRIPTION OF THE DRAWINGS

FIG. 6 is a user interface showing a scheduled update according to an embodiment.

DETAILED DESCRIPTION OF THE INVENTION

Figure 1:
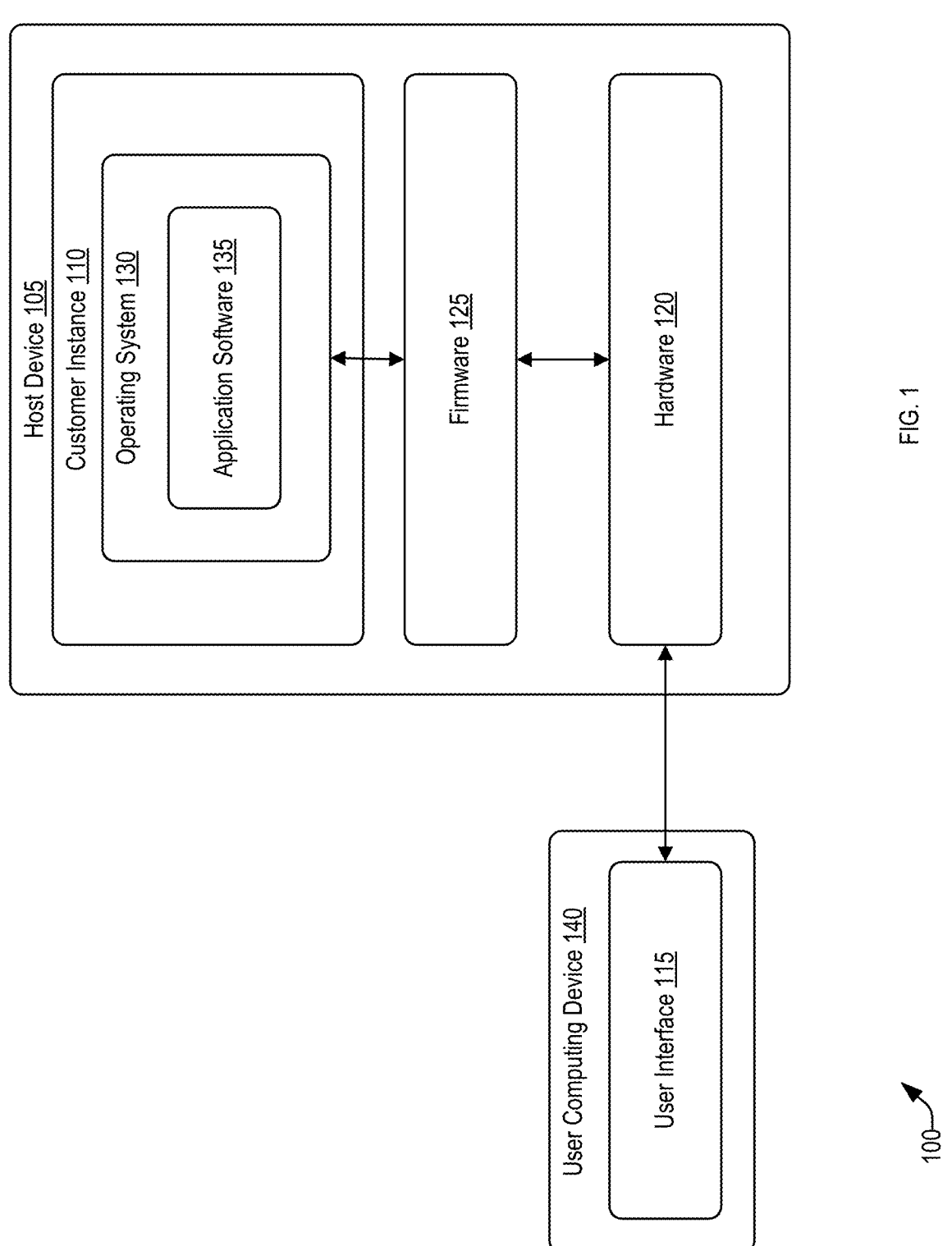
FIG. 1 shows a simplified diagram of a host device according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for performing a non-terminating firmware update of a host device (e.g., a server) are described herein. Firmware can be specialized software for controlling or interacting with hardware. For instance, an operating system can access hardware resources via a hardware abstraction provided by firmware. A host device can be a server hosting various virtual machines (e.g., instances) for various customers (e.g., tenancies) or a bare metal (BM) machine hosting a single operating system and/or other software for a single customer instance. Network addresses, such as an internet protocol (IP) address, can be assigned to the customer instance, and local storage for the instance can be attached to the occupied host device. An instance can be associated with a single customer and an instance can migrate between different host devices.

Firmware can be updated through a terminating or non-terminating firmware update. A terminating firmware update can require evacuating an instance from the host device. Evacuating an instance can mean removing a customer instance, as well as the network and/or hardware configurations for the instance, from a host device. An instance's IP address may be changed during the evacuation, and a customer may need to configure the instance and reconstruct local storage to return an instance to a pre-evacuation state. Customers may have no input on firmware update scheduling and little notice before an update begins. In sum, a terminating firmware update can be a significant disruption to a customer's operations.

A non-terminating firmware update can allow an instance to retain its network address and local storage. To perform a non-terminating firmware update, the host device can be shut down and disconnected from the network path and from local storage for a customer instance running on the device. The existing network and host configuration for the host device can be backed up before the device is disconnected. The disconnected host device can then be connected to a network location containing an operating system image with firmware updates and validation tests. The host device can boot to the operating system image and perform any updates and/or tests as needed.

After updating, the host device can be shut down and the backed-up network and host configurations can be restored to the device. The configured host device can be reconnected to the network path and local storage for the customer instance. The customer instance can be booted to the customer's original operating system. While the customer is not able to access a customer instance during a host device update, the customer can resume using the instance with minimal effort because the pre-update network address, storage shape, and host configuration can be restored to the instance after the update.

In an illustrative example, a customer receives a notification that her server is scheduled for a firmware update. The customer receives the notification via an application programming interface (API). The notification includes a time that the update is scheduled to begin and an option to change the scheduled time. After some reflection, the customer decides to begin the update immediately and uses the API to start the update early. While the update is performed, the customer takes a break and monitors the update progress via the API.

The update begins by shutting down the server and disconnecting it from the network and its boot storage. The server state, including network and device configurations, are stored, and the server is connected to an update image with the update code. The server boots into an operating system from the update image and the firmware is updated and validated using the update code. After validation tests confirm that the update was performed successfully, the server state is restored and the server is reconnected to the boot storage and network. The customer receives a notification that the update is completed via the API and resumes work.

FIG. 1 shows a simplified diagram 100 of a host device according to an embodiment. The host device 105 can be a computing device such as a server (e.g., a BM server hosting a customer instance 110). Hosting can mean that the server provides hardware resources to a customer and receives input or provides output to the customer via a user interface 115 on a user computing device 140. The hardware resources can include hardware 120 and the firmware 125 associated with the hardware. Hardware can include the physical components of the host device such as one or more processors, memory devices, input/output (IO) devices, graphics cards, sound cards, display devices, speakers, network interface cards, smart network cards, etc.

Firmware 125 can include software that permits customer instance 110 to interact with hardware 120. A user controlling a user computing device 140 may be unaware of firmware when the device is functioning properly. Unlike higher level programs such as the operating system 130 or application software 135, firmware can be specific to a particular piece of hardware. For instance, the same version of Windows 11, an operating system, can control two different network interface cards (NICs) without a noticeable change in performance. The firmware for the NICs, however, can be unique to each NIC and a specific NIC may only function with its specific firmware.

Figure 2:
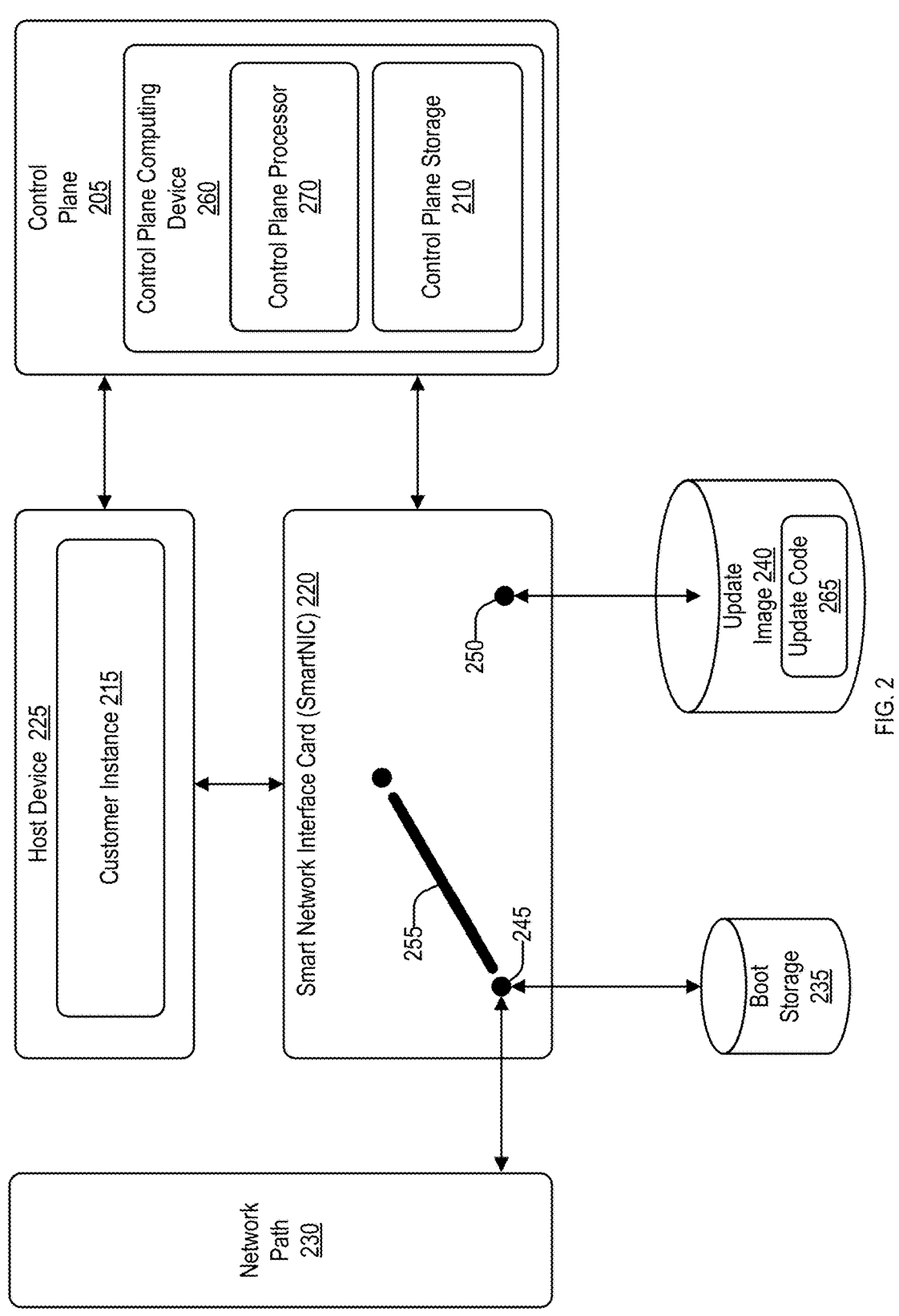
FIG. 2 shows a simplified diagram of a system for performing a non-terminating firmware update according to an embodiment.

FIG. 2 shows a simplified diagram 200 of a system for performing a non-terminating firmware update according to an embodiment. The control plane 205 can comprise the software and hardware infrastructure for implementing a cloud network. The control plane can contain a control plane computing device 260 that can read and write from control plane storage 210 (e.g., storage device of the control plane) using a control plane processor 270. The control plane computing device 260 can communicate with the customer instance 215 via a smart network interface card (SmartNIC) 220. In some embodiments, SmartNIC 220 can be a network interface card (NIC) or a computing device. Customer instance 215 can be hosted on a host device 225.

SmartNIC 220 can connect the customer instance 215 with a network path 230, boot storage 235, or an update image 240. Network path 230 can be a connection to a network such as the Internet. Input and output traffic between the customer instance and a user network, e.g. the Internet, can occur via network path 230. Boot storage 235 can be computer data storage (e.g., hard disk drive (HDD), solid state drive (SSD), etc.) can contain a system image including boot files, for one or more operating systems for customer instance 215. Boot files can include the boot loader, basic input/output system (BIOS) software, Linux kernel, initial ramdisk, bootsector, etc. Update image 240 can be computer data storage that can contain firmware updates, validation tests, update code, etc. In some circumstances, the update image 240 can be stored in SmartNIC 220, or in boot storage 235.

Update image 240 can contain update code 265 comprising one or more firmware updates or one or more validation tests. A firmware update can be a change to software that allows for low level control of hardware components in host device 225. For instance, a firmware update can be a change to the basic input/output system (BIOS) for host device 225. The update can be confirmed using validation tests from update code 265, and the validation tests can include instructing the host device to perform calculations or input/output operations. For example, the host device 225 may be instructed to calculate a value and the calculated value can be compared to a known value. A packet may be sent and received, via an input/output pathway, and the integrity of the received packet can be confirmed. Other validation tests are contemplated, and the validation tests may be performed after the update is completed.

A switch 255 can represent transitioning between a first configuration for normal use of host device 225, and a second configuration for use during a non-terminating update. Switch 255 can represent transitioning between the configurations, and switch 255 is not necessarily meant to represent a physical switch. Switch 255 can be implemented with circuitry and/or software in SmartNIC 220, host device 225, or control plane computing device 260. Switch 255 can be implemented using one or more top of rack (TOR) switches. Switch 255 can transition between a first terminal 245 and a second terminal 250.

The first terminal 245 can represent a first configuration where customer instance 215 is connected to network path 230 and boot storage 235. This first configuration, represented by first terminal 245, can be the default configuration for customer instance 215 during normal operations. In the first configuration, input/output traffic can be sent or received from host device 225 to network path 230. The customer instance 215, or host device 225, can communicate with user computer device 140 via network path 230. Boot storage 235 can comprise memory for host device 225, or customer instance 215, and boot storage 235 can contain one or more operating systems or one or more applications. Boot storage 235 can contain a system image for customer instance 215.

The second configuration, represented by the second terminal 250, can be the configuration during a non-terminating update. In the second configuration, represented by second terminal 250, customer instance 215 can be disconnected from network path 230 or connected to update image 240. Update image 240 can contain update code 265 comprising one or more firmware updates or validation tests. Update code 265 can include an update operating system and the one or more firmware updates or validation tests can be configured to run on the update operating system.

Figure 3:
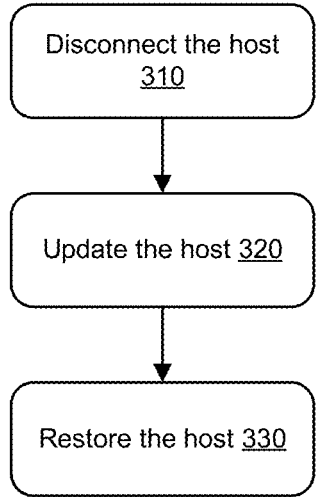
FIG. 3 is a simplified flowchart of a process for performing a non-terminating firmware update according to an embodiment.

FIG. 3 is a simplified flowchart of a process 300 for performing a non-terminating firmware update according to an embodiment. This process, in addition to the process from FIG. 5 and the method from FIG. 6, are illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 310, the host device is disconnected. The host device 225 can be disconnected from network path 230 or boot storage 235. SmartNIC 220 can disconnect the host device 225 in response to an instruction from control plane computing device 260 in control plane 205. The instruction can be sent by the control plane processor 270 via SmartNIC 220. The instruction from control plane computing device 260 can be in response to a scheduled update, a detected security threat, or a customer request. The customer may not be able to receive input or output from host device 225 or customer instance 215 during the update. The customer may be able to monitor the update process via API/console. Host device 224 may be manually disconnected from network path 230 or boot storage 235 via a top of rack (TOR) switch.

Host device 225 can be shut down before host device 225 is disconnected from network path 230 or boot storage 235 (e.g., switch 255 moved to second terminal 250). The device state (e.g., server state) can be retrieved from the host device 225 or customer instance 215 by the control plane computing device 260 or control plane processor 270. The retrieved state can include a network address (e.g., internet protocol (IP) address), a customer operating system, or configurations for host device 225 or customer instance 215. The retrieved state can be stored in control plane storage 210 by control plane processor 270. SmartNIC 220 can connect host device 225 or customer instance 215 to update image 240 (e.g., switch 255 can be flipped from first terminal 245 to second terminal 250).

At block 320, the host device is updated. Host device 225 can be booted into an update operating system from update image 240. Host device 225 can be booted in response to an instruction from control plane computing device 260 or control plane processor 270. The update operating system can provide the device state from host device 225 or customer instance 215 to control plane computing device 260. The device state can be stored in control plane storage 210 by control plane processor 270. The update operating system or customer operating system can be any operating system including Windows 11, macOS Monterrey, Linux based operating systems, etc. In some circumstances, the update operating system and customer operating system can be the same operating system. Control plane processor 270 or, control plane computing device 260, send an instruction to host device 225 to update the BIOS for host device 225 to point to a new location.

Update Operating system, update code 265, or update image 240, can contain firmware updates for host device 225. Control plane computing device 260, or control plane processor 270 can instruct host device 225 to update the firmware for host device 225 using the update operating system, update code 265, or update image 240. Host device 225 may restart one or more times during the update process. The update operating system, update code 265, or update image 240, can contain validation tests that can be used to determine if the firmware has been updated successfully. If the host device 225 or customer instance 215 fails a validation test, the update can be undone and the host device 225 or customer instance 215 can be restored to the pre-update software (e.g., the update can be rolled back).

At block 330, the host device is restored. After the firmware has been updated, or after the validation tests are successful, control plane computing device 260, or control plane processor 270, can instruct host device 225 to shut down. The shutdown host device 225 can be reconnected to the network path 230 or boot storage 235. Host device 225 or customer instance 215 can be booted to the customer operating system. The device state, including the original network address, can be restored to the host device 225 or customer instance 215. An agent on host device 225 can verify that the one or more updates are functioning properly, and the update can be undone if the agent determines that host device 225 is not functioning properly.

The agent may be pre-installed on the users boot storage 235 and the agent may be operating in the background when the system is booted. The agent itself can monitor anomalies of the customer instance, which can include but not limited to central processing unit (CPU) consumption, network traffic, memory consumption, etc. The agent may report the state to the control plane. The state may include success/failure or the monitored anomalies of the customer instance. Based on one or more thresholds the control plane 205 may determine that the firmware update interferes with the user configuration of the instance. For example, if the driver specified by the user configurations does not match the firmware which can send the customer instance 215 into an infinite reboot.

In an another embodiment, the control plane 205 may use Artificial Intelligence and Machine Learning (AI/ML) model to determine that the customer instance 215 behaves differently after the firmware update. Data accumulated by the agent and fed to the AI/ML model prior to the update can establish a "healthy" pattern comprising normal customer instance 215 behavior from before the update. If following the update, the result deviates significantly from the "healthy" pattern (e.g., an "unhealthy" pattern) the AI/ML model may determine that the update failed. Additional information, like customer input, network traffic can be used for training of such the AI/ML model. For example: if the customer reports problems with its instance following the update, the data from before and after the update can be fed into a training system for the AI/ML model. The customer may be informed of the update via notification from the UX or an API. In case of failure the control plane can initiate a rollback of the applied change following the non-terminating firmware update process 300 outlined above. A difference between an update and a rollback can be that the update image may contain the original firmware.

Figure 4:
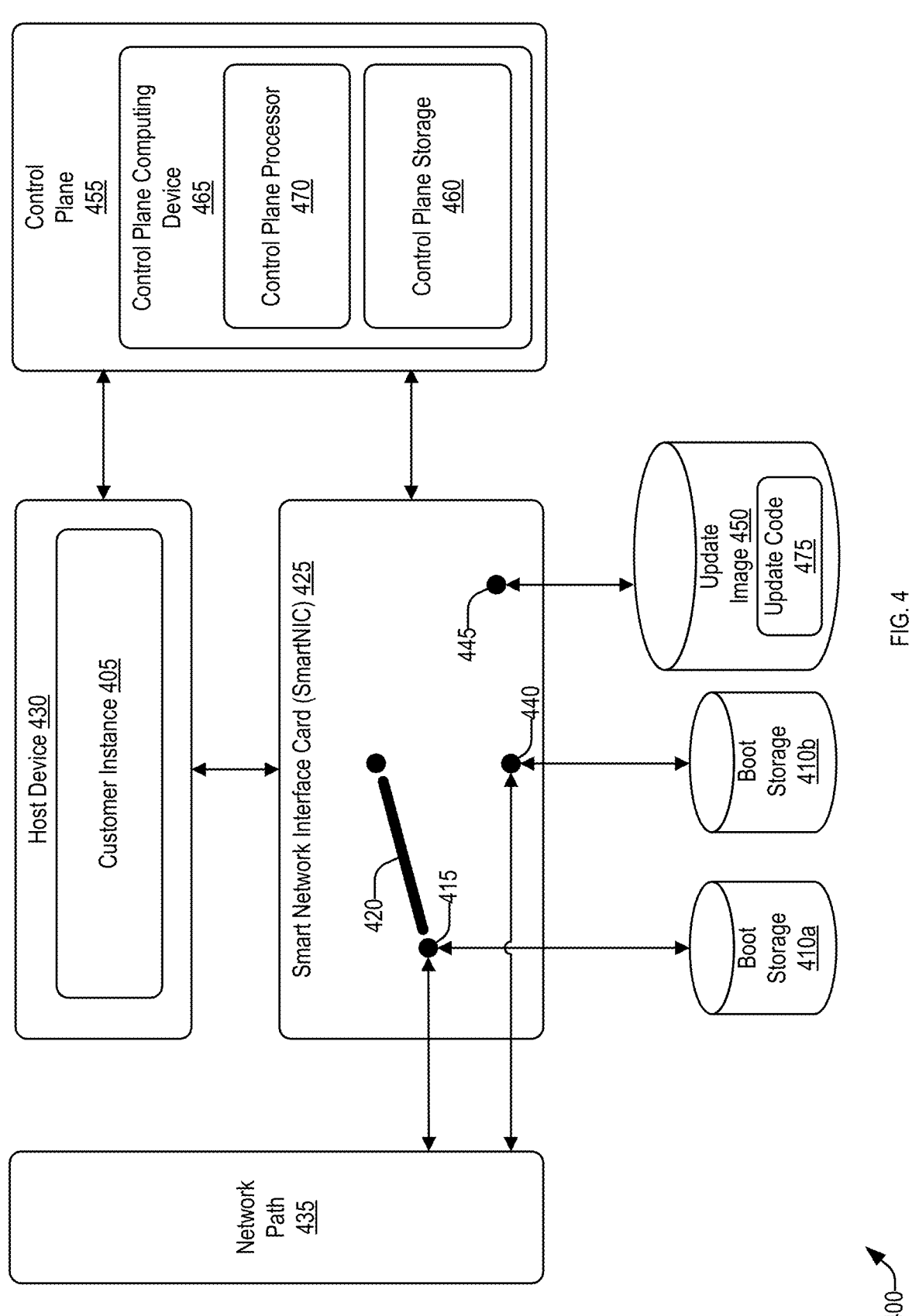
FIG. 4 shows a simplified diagram of a system for performing a non-terminating firmware update and system migration according to an embodiment.

FIG. 4 shows a simplified diagram 400 of a system for performing a non-terminating firmware update with a system migration according to an embodiment. A non-terminating firmware update with a system migration can mean that, during the update, the customer instance 405 is changed from a first system image stored in boot storage 410a to a second system image store in boot storage 410b. Boot storage 410a-b can contain a system image comprising one or more operating systems or applications for customer instance 405.

A switch 420 can represent transitioning between a first configuration for the first system image, a second configuration for the second system image, and a third configuration for use during a non-terminating update. Switch 420 can represent transitioning between the configurations, and switch 420 is not necessarily meant to represent a physical switch. Switch 420 can be implemented with circuitry and Software in SmartNIC 425, host device 430, or control plane computing device 455. The Switch 420 can be implemented using one or more top of rack (TOR) switches.

SmartNIC 425, host device 430, or control plane computing device 455 can change between configurations in response to a signal from control plane computing device 465, or control plane processor 470. The configurations can be changed by SmartNIC 425, host device 430, or control plane computing device 455 in response to a signal received via network path 435. The signal can be received from user computing device 140. Switch 420 can transition between a first terminal 415, a second terminal 440, and a third terminal 445.

In a first configuration, represented by a first terminal 415 for switch 420, the smart network interface card (SmartNIC) 425 can connect the host device 430 to the network path 435 and boot storage 410a. In the first configuration, input/output traffic can be sent or received from host device 430 to network path 435. The customer instance 405, or host device 430, can communicate with user computer device 140 via network path 435. Boot storage 410a can comprise memory for host device 430, or customer instance 405, and boot storage 410a can contain one or more operating systems or one or more applications. Boot storage 410a can contain a first system image for customer instance 405.

In a second configuration, represented by a second terminal 440, SmartNIC 425 can connect the host device 430 to the network path 435 and boot storage 410b. In the first configuration, input/output traffic can be sent or received from host device 430 to network path 435. The customer instance 405, or host device 430, can communicate with user computer device 140 via network path 435. Boot storage 410b can comprise memory for host device 430, or customer instance 405, and boot storage 410b can contain one or more operating systems or one or more applications. Boot storage 410b can contain a second system image for customer instance 405. Switching between the first configuration and the second configuration can mean that customer image is booted to the second system image instead of the first system image.

In a third configuration, represented by a third terminal 445, SmartNIC 425 can connect host device 430 or customer instance 405 to update image 450. In the third configuration, represented by third terminal 445, customer instance 405 can be disconnected from network path 435 or connected to update image 450. Update image 450 can contain update code 475 comprising one or more firmware updates or validation tests. Update code 475 can include an update operating system and the one or more firmware updates or validation tests can be configured to run on the update operating system. Control plane 455 can communicate with SmartNIC 425 in one or more of the three configurations. Control plane 455 can read and write from control plane storage 460.

Figure 5:
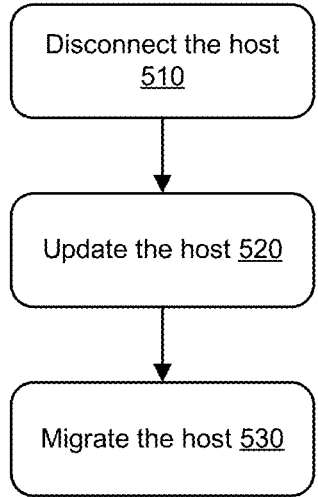
FIG. 5 shows a process for performing a non-terminating firmware update with a system migration according to an embodiment.

FIG. 5 shows a process 500 for performing a non-terminating firmware update with a system migration according to an embodiment. Turning to process 500 in greater detail, at block 510, the host device can be disconnected. Host device 430 can be shut down before host device 430 is disconnected. Control plane computing device 465 or control plane processor 470 can back up the existing network or host configuration for the host device 430 or customer instance 405 to control plane storage 460.

The SmartNIC 425 may be in the first configuration. Host device 430, or customer instance 405 can be shut down when SmartNIC 425 changes configurations. SmartNIC 425 can disconnect host device 430, or customer instance 405, from network path 435 or boot storage 410*a* (e.g., switch 420 can be moved from first terminal 415 to third terminal 445). Host device 430 may be manually disconnected from network path 435 or boot storage 410*a* via a top of rack (TOR) switch. SmartNIC 425 can disconnect in response to a command sent via control plane 455 from control plane computing device 465 or control plane processor 470. The command can be sent from user computer device 140 via network path 435. The command can be part of a scheduled firmware update, a firmware update in response to a security vulnerability, a customer initiated firmware update (e.g., from user interface 115), or a customer request to migrate host device 430 from the first system image to the second system image.

At block 520, the host can be updated. The SmartNIC may be in the third configuration for the update. The host device 430 can be connected to update image 450 by SmartNIC 425 (e.g., switch 420 can be moved to third terminal 445). Host device 430 can be connected to update image 450 via a TOR switch. Control plane computing device 465 or control plane processor 470 may instruct BIOS for host device 430 to point to a new location.

Update image 450 can contain update code comprising an update operating system with firmware updates or validation tests. Host device 430 can run the update operating system and perform the firmware updates or validation tests. Control plane computing device 465, or control plane processor 470 may instruct the host device to run the update operating system and perform the firmware updates or validation tests. Control plane computing device 465, or control plane processor 470, may instruct host device 430 to roll back the updates based on the validation tests. Rolling back the updates may mean reverting host device 430 to the firmware from before the updates. The update operating system may send a copy the device state for host device 430 to control plane computing device 465. Control plane processor 470, or control plane computing device 465, may store the device state copy in control plane storage 460 before updating the firmware for host device 430.

At block 530, the host can be migrated. Migrating host device 430 can mean changing the operating system, storage, applications, network configuration, or hardware configuration for host device 430 or customer instance 405. SmartNIC 425 can change to the second configuration for the migration. Migrating the host device 430 can mean booting the device to a new system image and replacing a first customer instance (e.g., customer instance 405) with a second customer instance. For example, the system image for the first customer instance can be stored in boot storage 410*a*. SmartNIC 425 can switch between the first configuration and the second configuration while host device 430, or customer instance 405, is shut down. Host device 430, or customer instance 405, can be booted to the system image for the second customer instance that is stored in boot storage 410*b*.

Returning to block 530, host device 430 can be changed to the third configuration and connected by SmartNIC 425 to boot storage 410*b* or network path 435 (e.g., switch 420 can be moved from third terminal 445 to second terminal 440). Host device 430 can be shut down and disconnected from update image 450 before SmartNIC 425 changes the configuration and host device 430 is connected to boot storage 410*b* or network path 435. SmartNIC 425 can connect or disconnect host device 430 from boot storage 410*b*, update image 450 or network path 435. The host device can be connected or disconnected via a TOR switch. The customer instance 405, or host device 430, can be booted to the system image in boot storage 410*b*.

FIG. 6 is a user interface 600 showing a scheduled update according to an embodiment. A user can be notified of a scheduled update via a user interface (UI), API, console, etc. Maintenance reboot 610 shows a date and time for a scheduled update. The user can decide to reschedule the update via the UI, API, console, etc.

Figure 7:
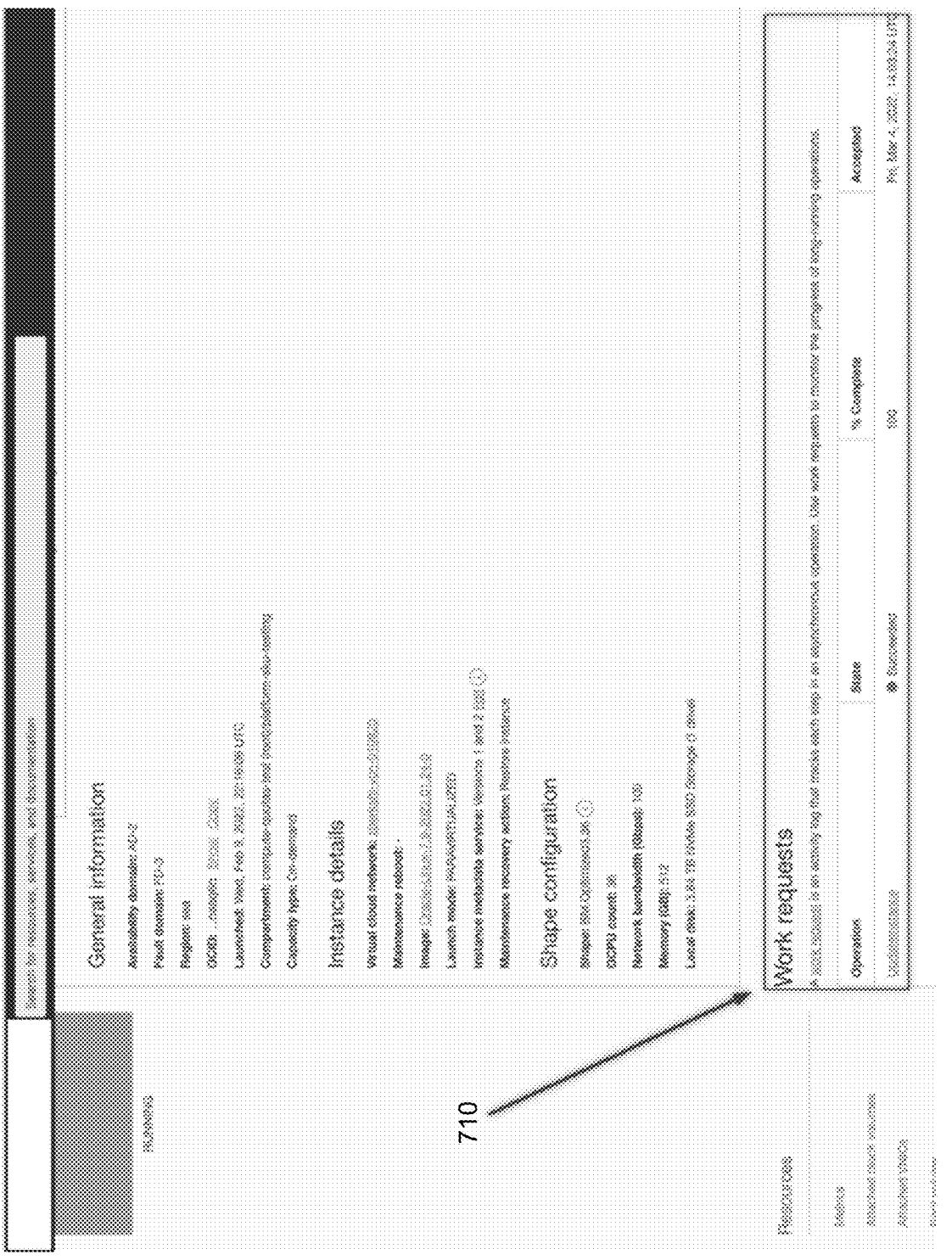
FIG. 7 is a user interface showing update progress according to an embodiment.

FIG. 7 is a user interface 700 showing update progress according to an embodiment. The update progress 710 can include a status for the update indicating whether the update was successful. Update progress 710 can also show a completion percentage for the update, or a time that the update was completed.

Figure 8:
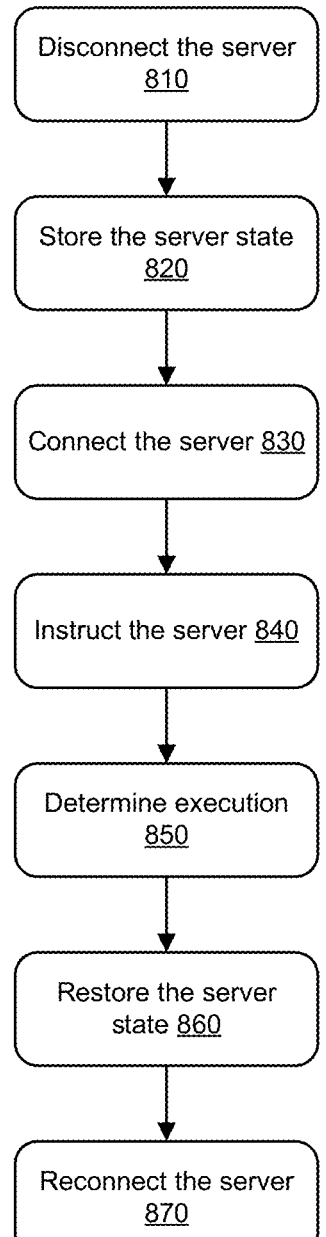
FIG. 8 is a simplified flowchart of a method for performing a non-terminating firmware update according to an embodiment.

FIG. 8 is a simplified flowchart 800 of a method for performing a non-terminating firmware update according to an embodiment. At block 810, the server can be disconnected. The server can be a host device (e.g., host device 105, 225, 430, etc.), and the server can be disconnected from a network path or a first boot storage. The network path, such as network path 230, 435, etc., can allow the server to communicate with a network (e.g., the Internet). The first boot storage can be one or more storage devices or a partition of a storage device containing a first system image that can include boot files (e.g., boot storage 235, 410*a-b*, etc.).

The server can be disconnected in response to a command from a computing device of the control plane (e.g., control plane computing device 260, 465, control plane processor 270, 470, etc.). The command can be a scheduled command that is part of a regular firmware update, a command issued in response to a detected security threat, or a command requested by a customer (e.g., a command requested via user interface 115). The server (e.g., host device 225, 430, etc.) may be shut down before the server is disconnected. The server can be disconnected by a SmartNIC 220, 425, etc. or via a TOR switch. A notification can be provided to a user, via user interface 115, before an update is initiated.

At block 820, the server state can be stored. The server state can be stored while the server is shut down. The server state can contain network configurations, device configurations, etc. for the server. The server state can be retrieved from the server in response to a command from a computing device of the control plane and stored in a storage device of the control plane (e.g., control plane storage 210, 460, etc.).

At block 830, the server can be connected. The server can be connected to an update storage device containing update code. The update storage device can be an update image (e.g., update image 240, 450, etc.), and the update code can be software comprising firmware updates, validation tests for firmware updates, or an operating system. The server can be connected to the update storage device by a SmartNIC (e.g., SmartNIC 220, 425, etc.) or by a TOR switch.

At block 840, the server can be instructed. The server can be instructed to execute the update code by a computing device of the control plane. Executing the update code can mean performing a firmware update. The server can be booted to an operating system from the update storage device before performing the update, and the server may need to restart one or more times to perform the update. A user can monitor the update progress via an application programming interface (API) or a console (e.g., user interface 115, 600, 700, etc.).

At block 850, the execution can be determined. Determining the execution can mean that a computing device of the control plane verifies that the firmware has been successfully updated. The computing device of the control plane can instruct the server to perform one or more validation tests and the server can provide the test results can be provided to the computing device of the control plane. The computing device of the control plane can use the test results to determine if the update has been performed successfully.

At block 860, the server state can be restored. The server state can be retrieved from control plane storage (e.g., control plane storage 210, 460, etc.) by a computing device of the control plane. The retrieved server state, including network or BIOS configurations, can be sent by the computing device of the control plane to the server via the SmartNIC. The computing device of the control plane can send an instruction to the server instructing the server to apply the retrieved server state. The server can be shut down by a computing device of the control plane before the server state is sent to the server. Restoring the server state can include restoring the server to its original network address (e.g., IP address) from before the update.

At block 870, the server can be reconnected. The server can be reconnected to boot storage. The server can be booted to the first system image containing a customer operating system after the server is reconnected to boot storage. In some circumstances, the server can be migrated by connecting the server to a second boot storage instead of the first boot storage from block 810. The server can be booted to a second system image from the second boot storage. The second boot storage can be one or more storage devices or a partition of a storage device containing a first system image that can include boot files (e.g., boot storage 235, 410*a-b*, etc.). One or more agents on the customer operating system can verify that the update has been performed successfully. If the update has not been performed successfully, the firmware can be reverted to the firmware version from before the update.

Whether the update has been performed successfully may be verified using an artificial intelligence/machine learning (AI/ML) model. The AI/ML model can be part of the control plane (e.g., control plane 205), and the AI/ML model can be generated by training an algorithm to produce the AI/ML model. To train the AI/ML model, training data with a known classification, from one or more host devices, can be provided as input to an algorithm. The classification can be that the input training data is healthy or unhealthy. The algorithm can output a classification (e.g., as a confidence score or probability that the input data is healthy or unhealthy) for the input training data segments, and, during training, the algorithm's parameters can be modified until the output classification for the input training segment matches the known classification for that data. For a neural network, the model parameters can be the total number of nodes, the number of nodes in a layer, the number of layers, and the weights for connections between nodes, etc. Once the algorithm properly classifies the training data, the algorithm can be tested on verification data. The verification data can be training data, or data like the training data, that was not used earlier in the training process. If the algorithm correctly classifies the verification data, the algorithm can be a trained AI/ML model. The AI/ML model can be used to verify if an update was performed successfully. If the AI/ML model outputs a "healthy" classification, the model may have been performed successfully. If the AI/ML model outputs an "unhealthy" classification, the model may not have been performed successfully.

Examples of AI/ML models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact)

can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
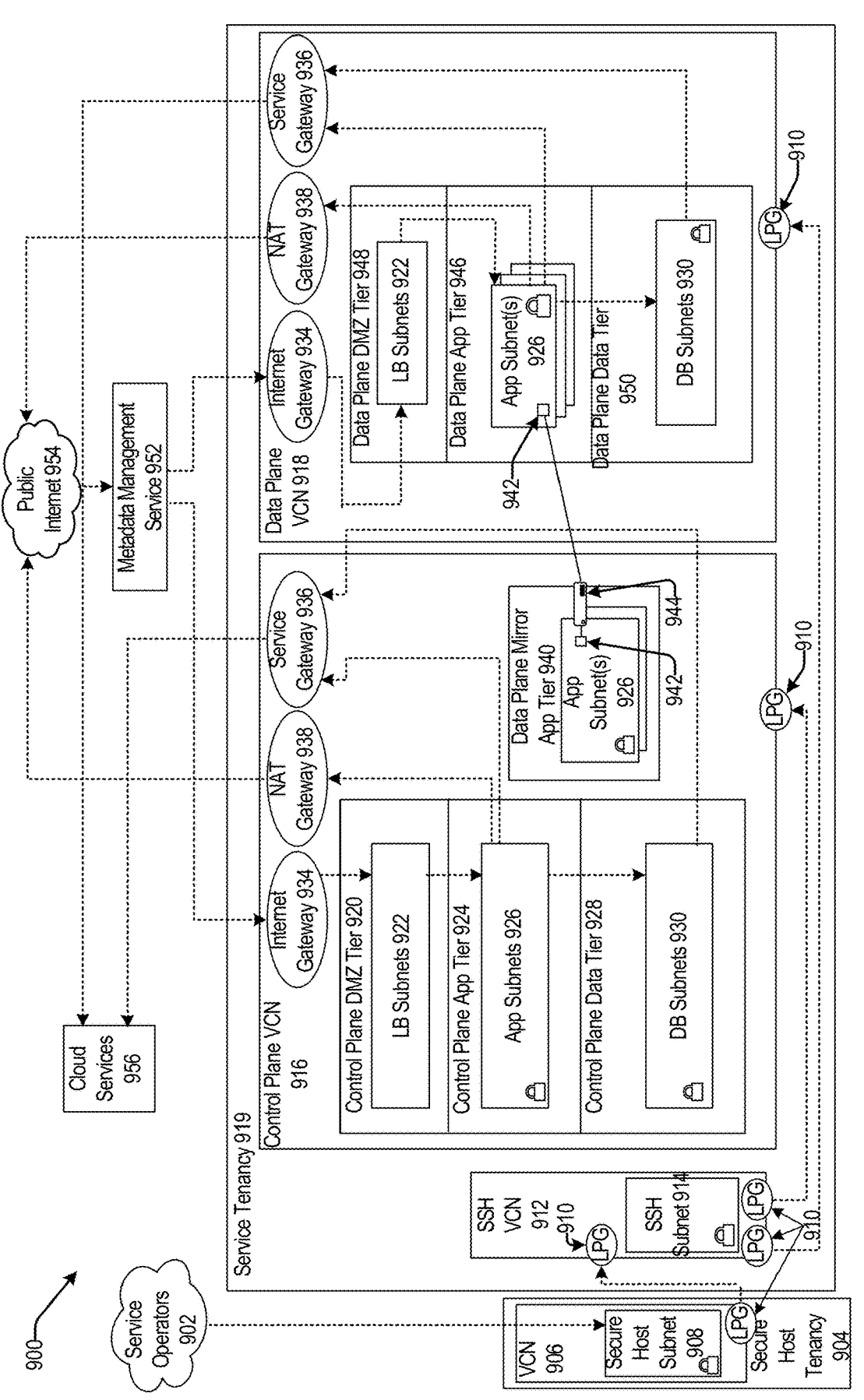
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
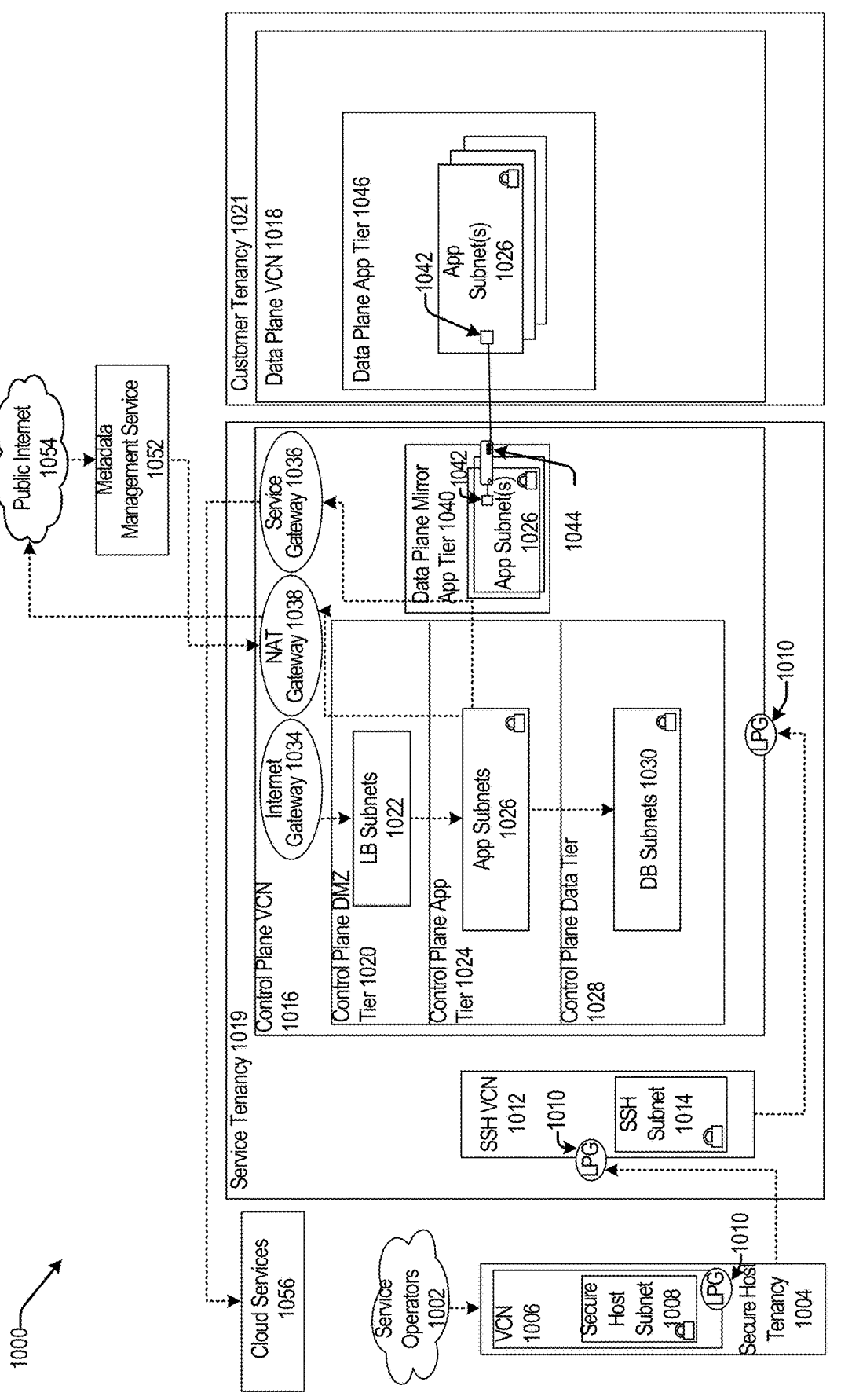
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
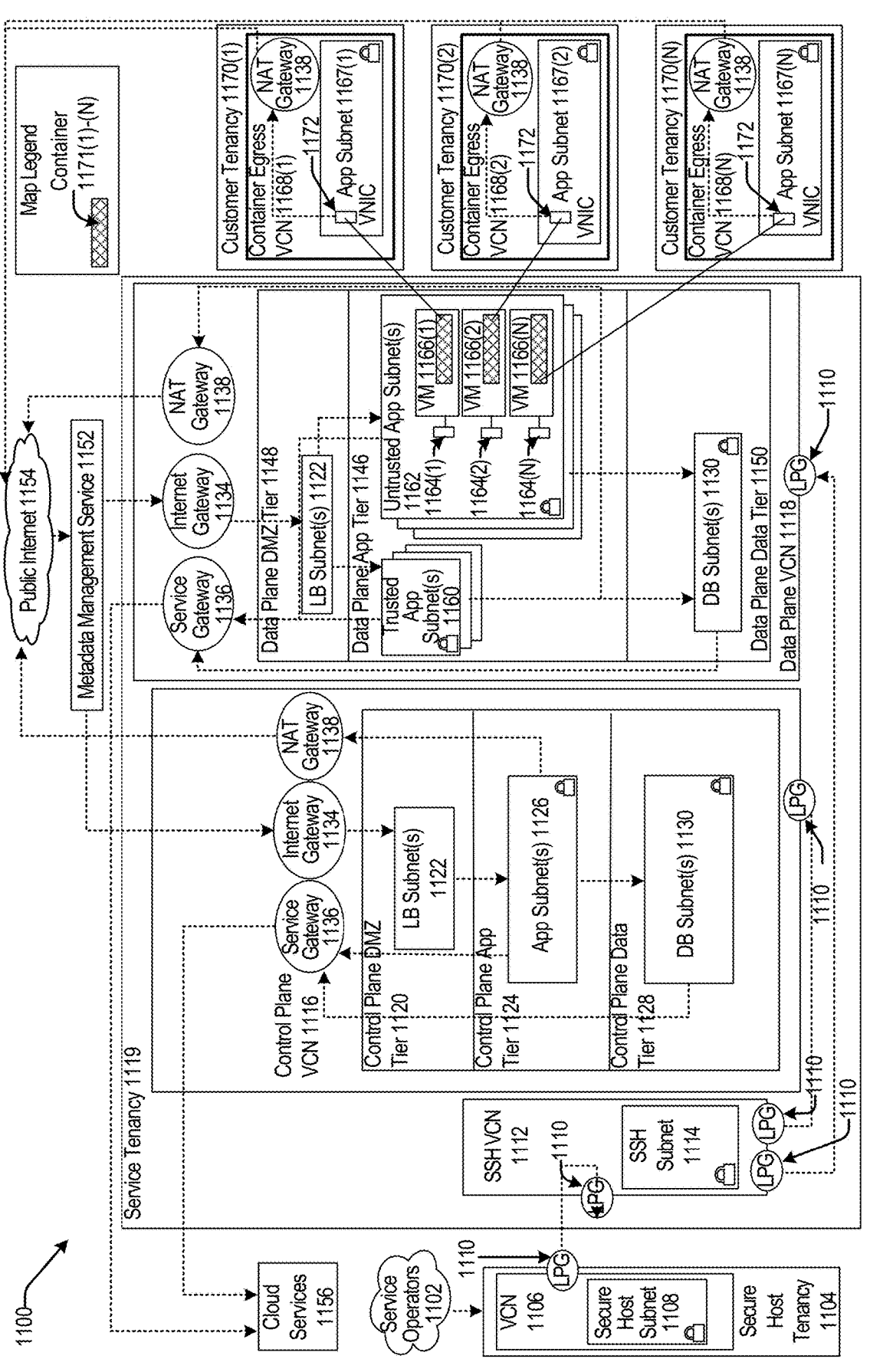
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171 (1)-(N) may be communicatively coupled to the customer tenancy 1170 and may be configured to transmit or receive data from the customer tenancy 1170. The containers 1171 (1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
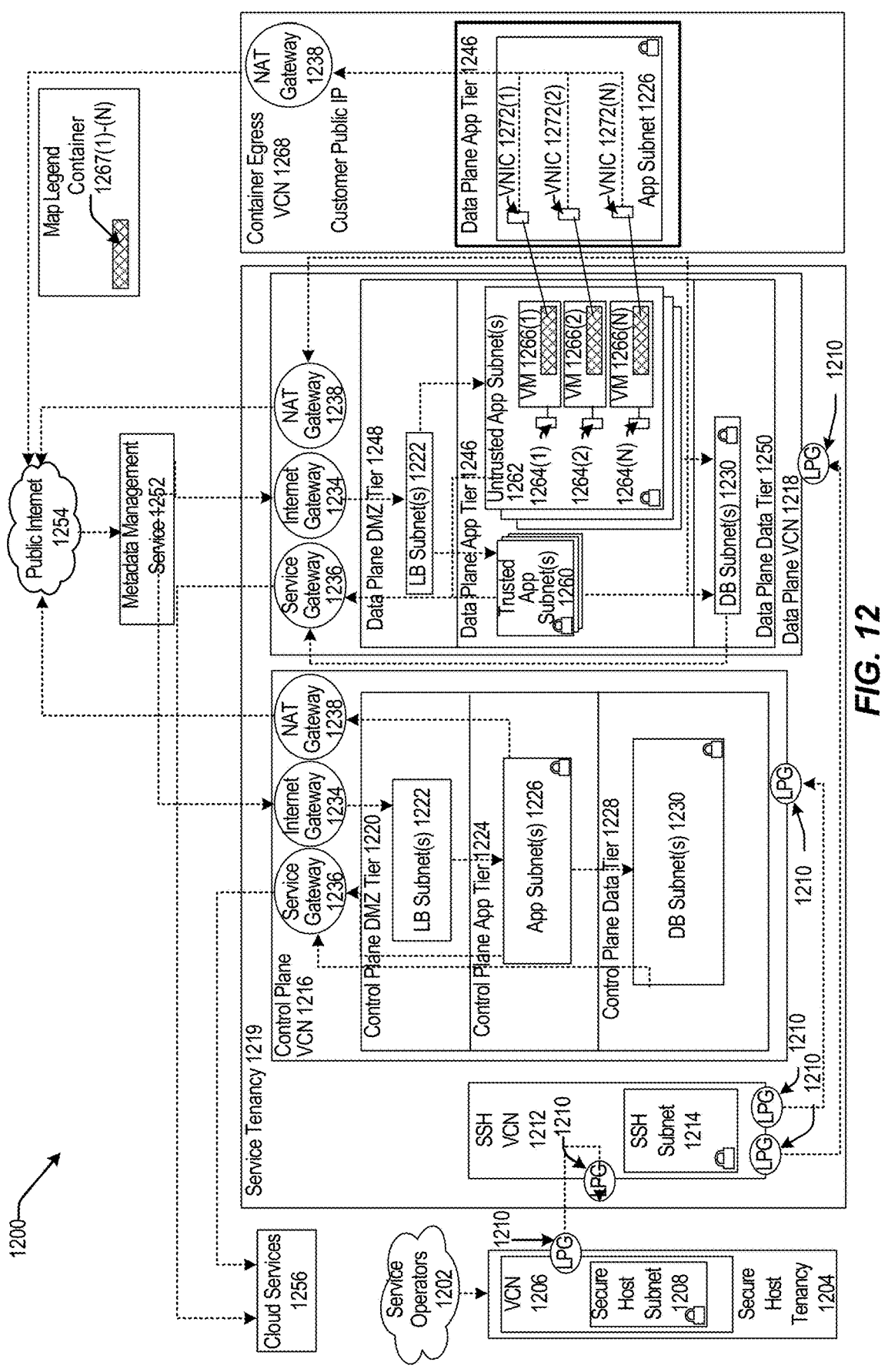
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
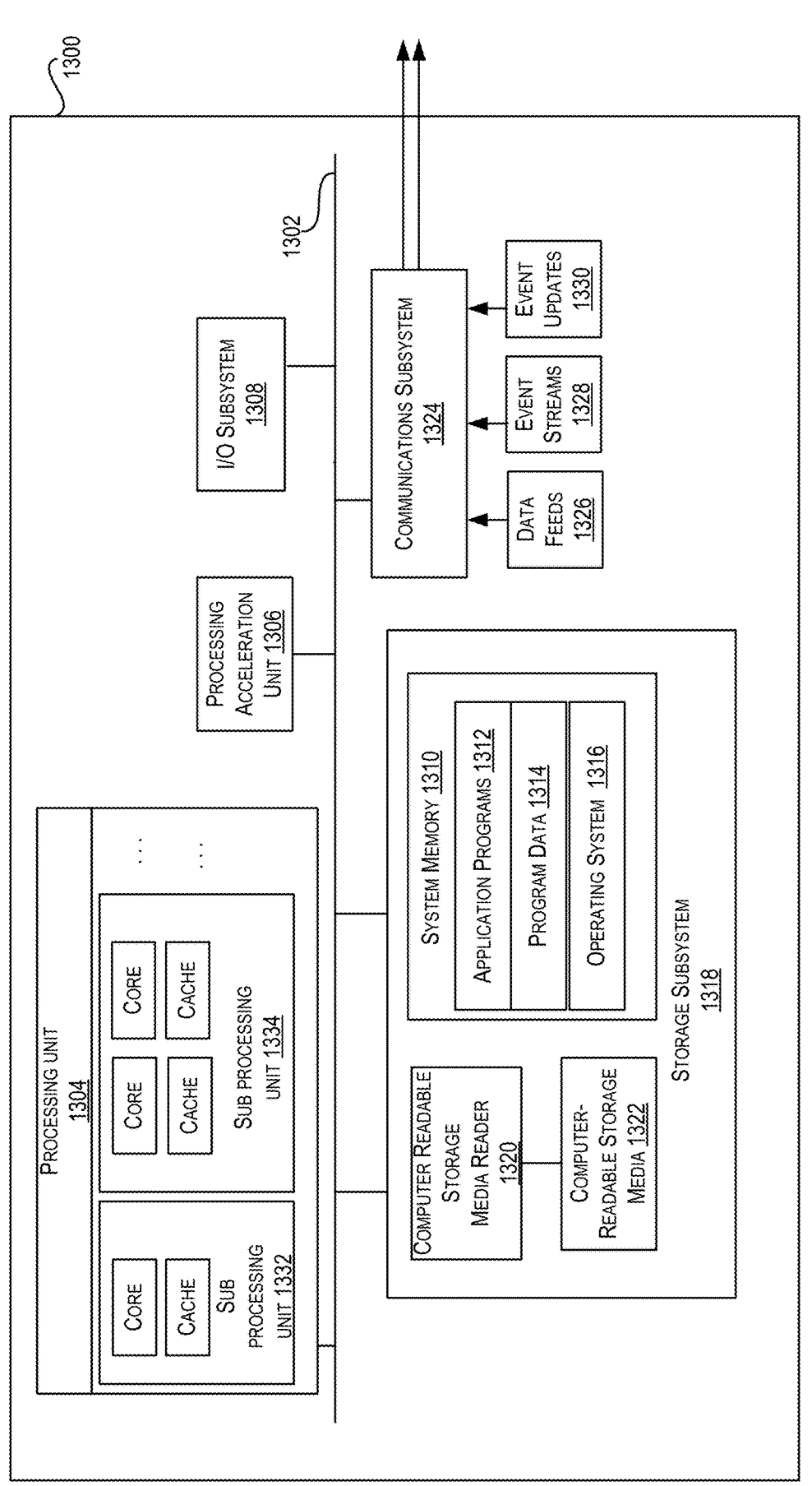
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

providing, by a computing device of a control plane and to a user device, a notification indicating a scheduled time for an update to a server;

receiving, by the computing device of the control plane and from the user device, a request to change the scheduled time;

changing, by the computing device of the control plane, the scheduled time; and performing the update at the scheduled time by:

storing, by the computing device of the control plane, a server state of the server in a storage device of the control plane, the server state comprising an initial network address that identifies the server on a network path and a host configuration for the server;

instructing, by the computing device of the control plane, the server to shut down for a first time;

instructing, by the computing device of the control plane and while the server is shut down for the first time, a network interface card to change a configuration of the server to disassociate the server from a first boot storage device, the network interface card disassociating the server from the initial network address and the first boot storage device including a customer operating system, the first boot storage device being locally connected to the computing device;

instructing, by the computing device of the control plane and while the server is shut down for the first time, the network interface card to change the configuration of the server to associate the server with an update storage device containing an update operating system and an update code;

instructing, by the computing device of the control plane, the server to boot into the update operating system;

instructing, by the computing device of the control plane, the server to execute the update code;

determining, by the computing device of the control plane, that the server has executed the update code;

instructing, by the computing device of the control plane, the server to shut down for a second time;

instructing, by the computing device of the control plane and while the server is shut down for the second time, the network interface card to change the configuration of the server to reassociate the server with the first boot storage device;

instructing, by the computing device of the control plane, the server to boot into the first boot storage device; and restoring, by the computing device of the control plane, the server to the server state by associating the server to the network path using the initial network address and restoring the server to the host configuration.

2. The method of claim 1, further comprising reconnecting the server by changing the configuration to:

connecting, by the computing device of the control plane, the server to a second boot storage device, wherein the second boot storage device is different from the first boot storage device.

3. The method of claim 1, wherein the server comprises a bare metal machine (BM).

4. The method of claim 1, further comprising determining that the server has executed the updated code by:

instructing, by the computing device of the control plane, the server to perform diagnostic tests.

5. The method of claim 1, further comprising disconnecting the server by:

accessing a request to update a server; and disconnecting the server from at least one of the network path or the first boot storage device in response to the request.

6. The method of claim 1, wherein the network interface card is a smart network interface card.

7. The method of claim 1, wherein the server state further comprises a storage shape for customer instances on the server and a customer instance and wherein the restoring the server state further includes restoring the storage shape and resuming the customer instance.

8. The method of claim 1, further comprising:

determining, by the computing device of the control plane, whether the server is operating correctly after updating; and undoing, by the computing device of the control plane and responsive to determining the server is not operating correctly after performing the update, the update.

9. A non-transitory computer-readable medium storing a set of instructions, the set of instructions comprising:

one or more instructions that, when executed by one or more processors of a computing device of a control plane, configure the computing device of the control plane to:

provide, to a user device, a notification indicating a scheduled time for an update to a server;

receive, from the user device, a request to change the scheduled time;

change the scheduled time; and perform the update at the scheduled time by performing operations to:

store a server state of the server in a storage device of the control plane, the server state comprising an initial network address that identifies the server on a network path and a host configuration for the server;

instruct the server to shut down for a first time;

instruct, while the server is shut down for the first time, a network interface card to change a configuration of the server to disassociate the server from a first boot storage device, the network interface card disassociating the server from the initial network address and the first boot storage device including a customer operating system, the first boot storage device being locally connected to the computing device;

instruct, while the server is shut down for the first time, the network interface card to change the configuration of the server to associate the server with an update storage device containing an update operating system and an update code;

instruct the server to boot into the update operating system;

instruct the server to execute the update code;

determine that the server has executed the update code;

instruct the server to shut down for a second time;

instruct, while the server is shut down for the second time, the network interface card to change the configuration of the server to reassociate the server with the first boot storage device;

instruct the server to boot into the first boot storage device; and restore the server to the server state by associating the server to the network path using the initial network address and restoring the server to the host configuration.

10. The non-transitory computer-readable medium of claim 9, further comprising reconnecting the server by instructions to change the configuration to:

connect to a second boot storage device, wherein the second boot storage device is different from the first boot storage device.

11. The non-transitory computer-readable medium of claim 9, wherein the server comprises a bare metal machine (BM).

12. The non-transitory computer-readable medium of claim 9, wherein the one or more instructions, that cause the computing device of the control plane to determine that the server has executed the updated code, cause the computing device of the control plane to:

instruct the server to perform diagnostic tests.

13. The non-transitory computer-readable medium of claim 9, further comprising:

verifying that the update code was executed successfully using an artificial intelligence/machine learning (AI/ML) model.

14. The non-transitory computer-readable medium of claim 9, wherein the one or more instructions, that cause the computing device of the control plane to disconnect the server, cause the computing device of the control plane to:

access a request to update a server; and disconnect the server from at least one of the network path or the first boot storage device in response to the request.

15. The non-transitory computer-readable medium of claim 9, wherein the server state further comprises a storage shape for customer instances on the server and a customer instance and wherein the restoring the server state further includes restoring the storage shape and resuming the customer instance.

16. The non-transitory computer-readable medium of claim 9, wherein the one or more instructions further cause the computing device of the control plane to:

determine, by the computing device of the control plane, whether the server is operating correctly after updating; and undo, by the computing device of the control plane and responsive to determining the server is not operating correctly after performing the update, the update.

17. A computing device of a control plane, comprising:

one or more memories; and one or more processors, communicatively coupled to the one or more memories, configured to:

provide, to a user device, a notification indicating a scheduled time for an update to a server;

receive, from the user device, a request to change the scheduled time;

change the scheduled time; and perform the update at the scheduled time by performing operations to:

store a server state of the server in a storage device of the control plane, the server state comprising an initial network address that identifies the server on a network path and a host configuration for the server;

instruct the server to shut down for a first time;

instruct, while the server is shut down for the first time, a network interface card to change a configuration of the server to disassociate the server from a first boot storage device, the network interface card disassociating the server from the initial network address and the first boot storage device including a customer operating system, the first boot storage device being locally connected to the computing device;

instruct, while the server is shut down for the first time, the network interface card to change the configuration of the server to associate the server with an update storage device containing an update operating system and an update code;

instruct the server to boot into the update operating system;

instruct the server to execute the update code;

determine that the server has executed the update code;

instruct the server to shut down for a second time;

instruct, while the server is shut down for the second time, the network interface card to change the configuration of the server to reassociate the server with the first boot storage device;

instruct the server to boot into the first boot storage device; and restore the server to the server state by associating the server to a network path using the initial network address and restoring the server to the host configuration.

18. The computing device of the control plane of claim 17, further comprising reconnecting the server by one or more processors and one or more memories configured to change the configuration to:

connect the server to a second boot storage device, wherein the second boot storage device is different from the first boot storage device.

19. The computing device of the control plane of claim 17, wherein the one or more processors, that determine that the server has executed the updated code, are further configured to:

instruct the server to perform diagnostic tests.

20. The computing device of claim 17, further comprising:

performing the update at the scheduled time by performing operations to:

determine, by the computing device of the control plane, whether the server is operating correctly after updating; and undo, by the computing device of the control plane and responsive to determining the server is not operating correctly after performing the update, the update.

* * * * *